Aug. 22, 1933.  G. SPATTA  1,923,334
DIE
Filed Jan. 16, 1929  9 Sheets-Sheet 1

Witness:
William P. Kilroy

Inventor:
George Spatta
By Brown, Jackson, Boettcher & Dienner
Attys

Aug. 22, 1933.  G. SPATTA  1,923,334
DIE
Filed Jan. 16, 1929  9 Sheets-Sheet 2

Witness:
William P. Kilroy

Inventor:
George Spatta
By Brown, Jackson, Boettcher + Dienner
Attys

Aug. 22, 1933.　　　　G. SPATTA　　　　1,923,334
DIE
Filed Jan. 16, 1929　　　9 Sheets-Sheet 3

Witness:
William P. Kilroy

Inventor:
George Spatta
By Brown, Jackson, Boettcher & Dienner
Attys.

Aug. 22, 1933.   G. SPATTA   1,923,334
DIE
Filed Jan. 16, 1929   9 Sheets-Sheet 4
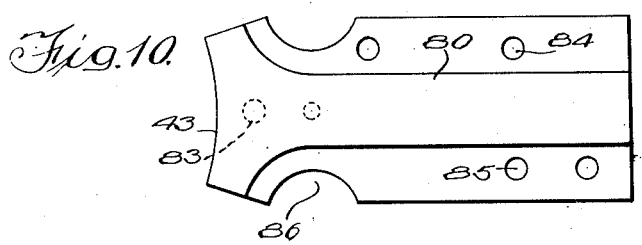
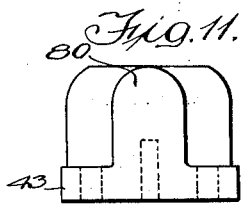
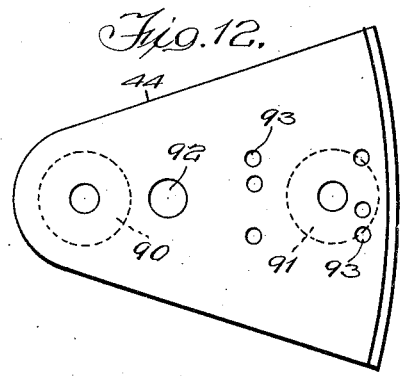
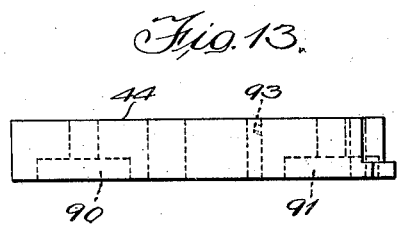
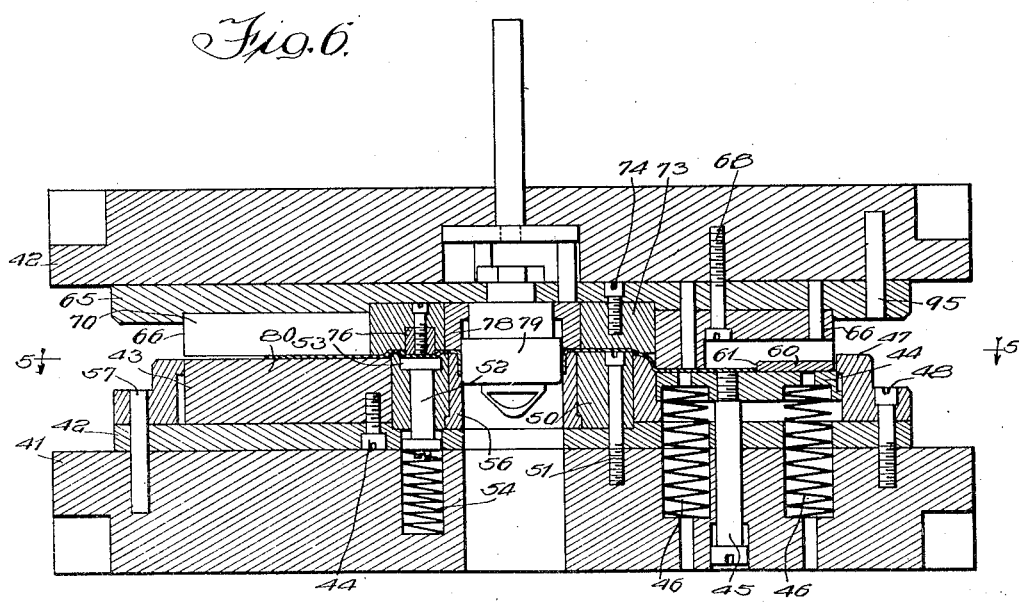
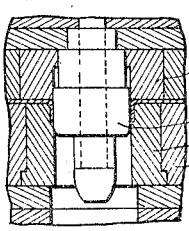
Inventor:
George Spatta
Witness:
William P. Kilroy Aug. 22, 1933.                G. SPATTA                1,923,334
                                 DIE
                         Filed Jan. 16, 1929        9 Sheets-Sheet 5

Witness:
William P. Kilroy

Inventor:
George Spatta
Brown, Jackson, Boettcher
and Dienner
Attys.

Aug. 22, 1933.　　　　G. SPATTA　　　　1,923,334
DIE
Filed Jan. 16, 1929　　　9 Sheets-Sheet 6

Witness:
William P. Kilsey

Inventor:
George Spatta
By Brown, Jackson, Boettcher & Dienner
Attys.

Aug. 22, 1933.   G. SPATTA   1,923,334
DIE
Filed Jan. 16, 1929   9 Sheets-Sheet 7

Witness:
William P. Kilroy

Inventor:
George Spatta
By Brown, Jackson, Boettcher
+ Diehner - Attys

Aug. 22, 1933.  G. SPATTA  1,923,334
DIE
Filed Jan. 16, 1929    9 Sheets-Sheet 8

Witness:
William P. Kilroy

Inventor:
George Spatta
By Brown, Jackson, Boettcher & Wiener
Attys.

Aug. 22, 1933.  G. SPATTA  1,923,334
DIE
Filed Jan. 16, 1929  9 Sheets-Sheet 9
Fig. 21.
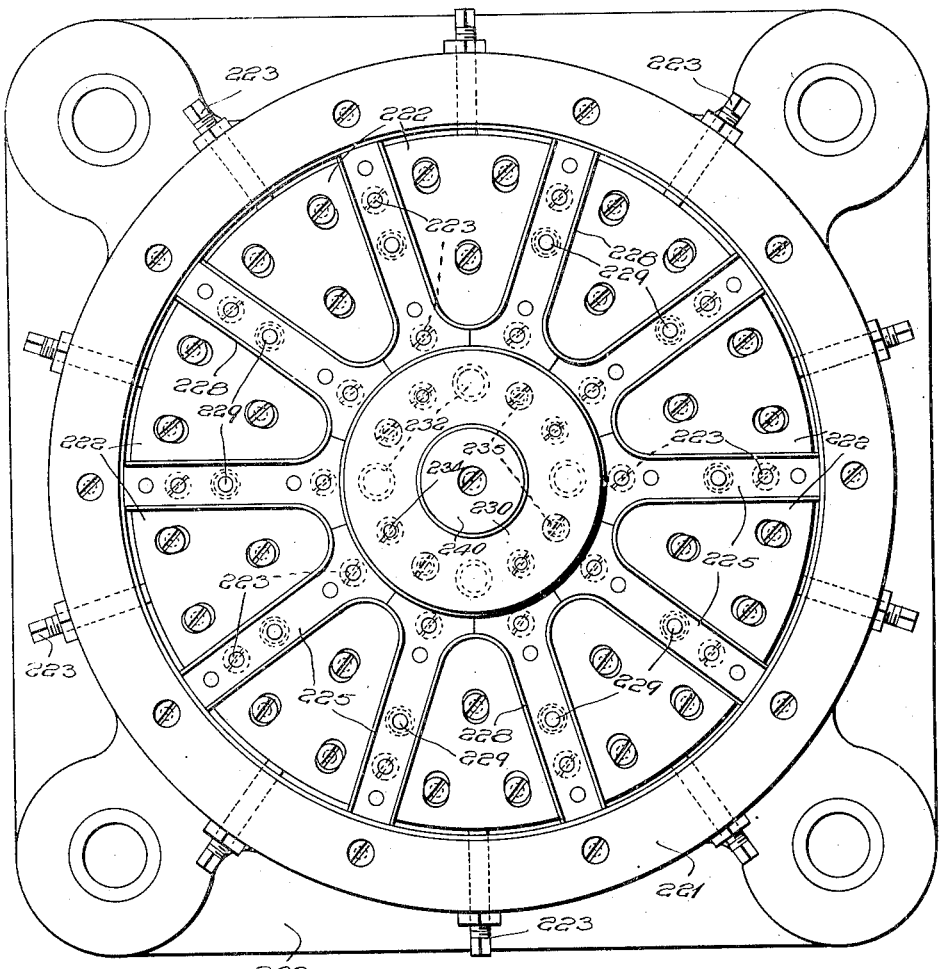
Fig. 23.
Fig. 22.
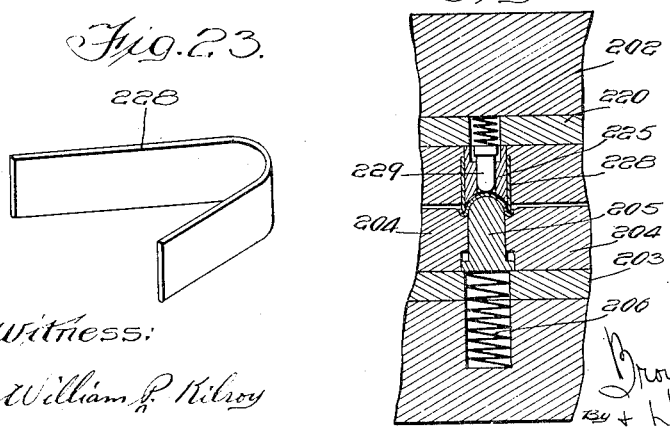
Witness:
William P. Kilroy
Inventor:
George Spatta
Brown, Jackson, Boettcher
By Diener
Attys Patented Aug. 22, 1933

1,923,334

UNITED STATES PATENT OFFICE 1,923,334

DIE

George Spatta, Buchanan, Mich., assignor to Clark Equipment Company, Buchanan, Mich., a Corporation of Michigan Application January 16, 1929. Serial No. 332,763

8 Claims. (Cl. 113—49)

This invention relates to the process of manufacturing a sheet metal spider for wheels of the type disclosed in my copending application, Serial No. 280,981, filed May 28, 1928, and is more particularly concerned with the novel dies used in the manufacture of the spider.

The wheel comprises a spoked spider formed of two halves each constructed of sheet metal, joined together into an integral mechanical structure, and the spider being then forced or otherwise introduced under compression into a channel shaped rim or felloe and there locked or otherwise secured in place. For a more complete description of the spider itself, as well as of the wheel into which it is formed, reference may be had to the above referred to application.

At the present time wheels are made in various standard sizes as to the outside diameter, and for a given standard outside diameter there are two possible inside or hub diameters depending upon whether the wheel is a front or a rear wheel. Spiders for wheels of different sized outside diameters can easily be made on a single set of dies, the spokes of the spiders being then cut to size if they are too large. To change the inside or hub diameter is, however, out of the question, and it was heretofore deemed necessary to have different sets of dies for manufacturing wheels of different hub diameters. It is an object of the present invention to provide a set of dies for forming spiders of the kind here contemplated, said dies being constructed so that they may be adjusted or altered so as to enable the same die set to be used to make spiders of various hub diameters. The dies are provided with readily removable interchangeable center units for punching various sized hub holes in the sheet metal blank, the center units being held in position in a novel way so as to permit the ready removal of one unit and insertion of another.

It is a further object of the present invention to provide a novel set of dies for performing the successive operations in the manufacture of sheet metal spoke spiders of the kind here contemplated, the set comprising a compound blanking and notching die for notching a sheet metal disc preparatory to the spoke forming operation, a forming die for forming semitubular spokes in the blank and for forming the hub of the spider, a trimming and piercing die for trimming the metal between adjacent spokes and for piercing a number of bolt holes in the hub of the spider, and an edge curling die for forming curled flanges along the sides of the spoke and along the edges of the web portion into which the spokes merge.

The attainment of the above and further objects of the present invention will be apparent from the following specification taken in conjunction with the accompanying drawings forming a part thereof.

In the drawings:

Fig. 6 is a sectional view of the forming die, said view being taken along the line 6—6 of Fig. 5;

Figs. 10 and 11 are top and end views, respectively, of a tool used in the die shown in Fig. 5 for forming semi-cylindrical spokes in the spider;

Figs. 12 and 13 are top and side views, respectively, of the tool used in the die shown in Fig. 5 for forming the web between the spokes of the spider;

Fig. 14 is a sectional view of an interchangeable center unit for the die shown in Fig. 5;

Fig. 21 is a bottom view of the upper edge curling die, said view being taken along the line 19—19 of Fig. 20 looking in a direction opposite that indicated by the arrows;

Fig. 22 is a fragmentary sectional view taken along the line 22—22 of Fig. 20; and Fig. 23 is a view of the steel spring curling tool for use in the die shown in Fig. 19.

Figure 1:
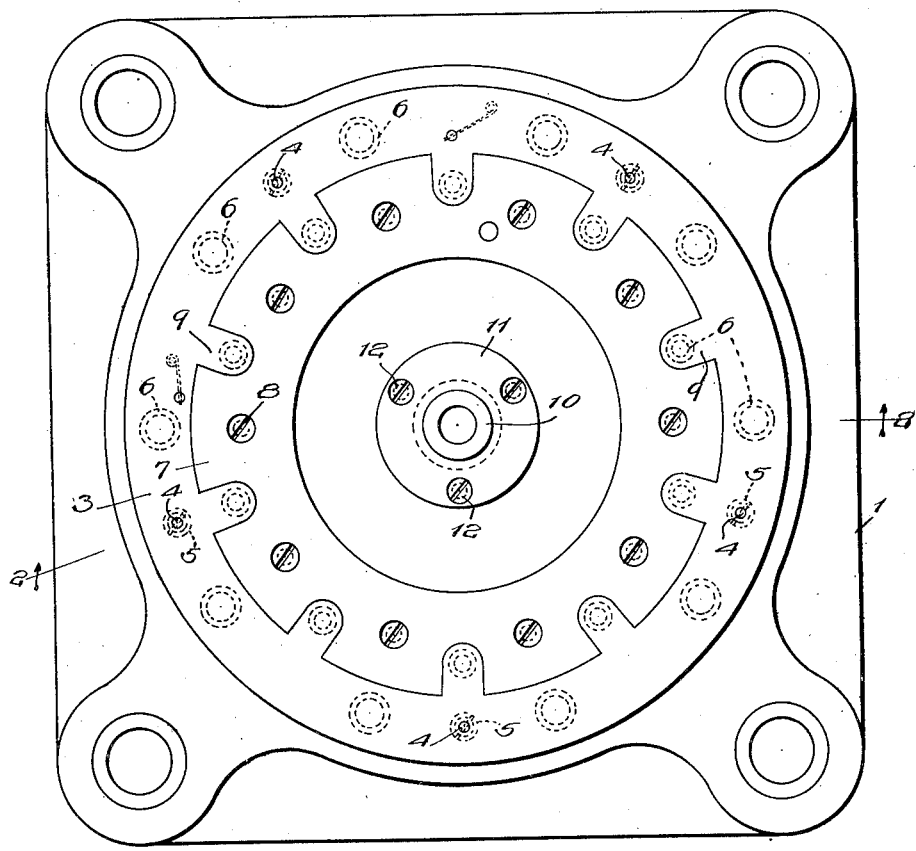
Fig. 1 is a top view of the lower blanking and notching die, said view being taken along the line 1—1 of Fig. 2 looking in the direction of the arrows.
Figure 2:
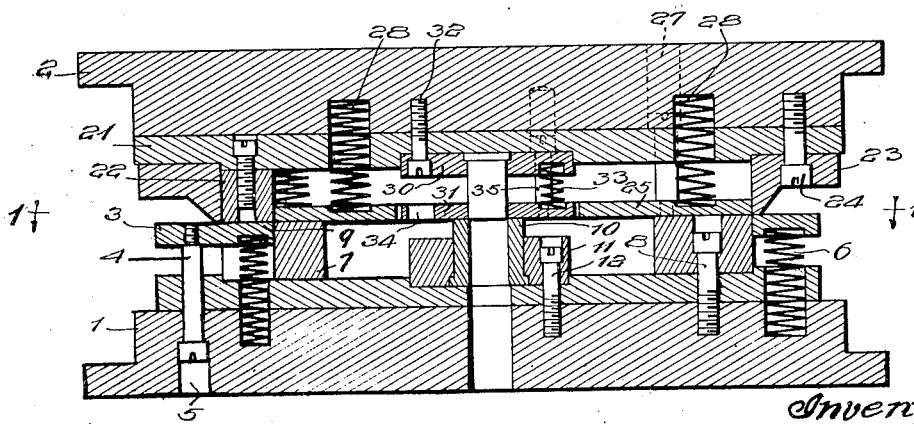
Fig. 2 is a sectional view taken along the line 2—2 of Fig. 1.
Figures 3, 4:
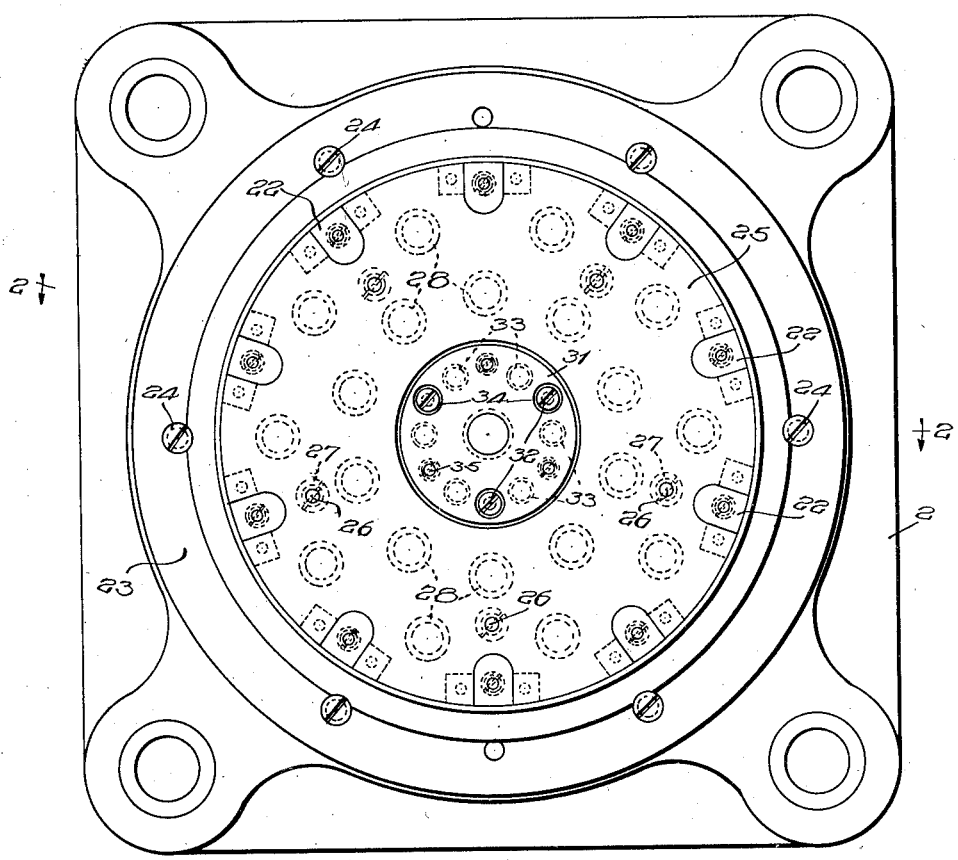
Fig. 3 is a bottom view of the upper blanking and notching die, said view being taken along a line such as 1—1 of Fig. 2 looking in the direction opposite that indicated by the arrows.
Fig. 4 is a sectional view of an interchangeable center unit for the die shown in Figs. 1, 2 and 3.

Referring now more particularly to the die shown in Figs. 1, 2 and 3, which is the die for forming a number of spaced notches along the periphery of a circular disc and for producing a central opening in the disc, substantially as shown in Fig. 1 of my above referred to application, there is shown a die consisting of a lower stationary bolster 1 and an upper movable bolster 2 carrying the forming tools. The plate 3 is secured to the bolster 1 by means of a number of uniformly spaced bolts 4 the heads of which are free to slide within the grooves 5 in the lower bolster. Ten uniformly spaced springs 6 maintain the plate 3 in its uppermost position as far above the bolster 1 as the bolts 4 will permit. An annular ring 7 is rigidly bolted to the bolster 1 by means of a number of spaced bolts 8. The ring or plate 3 has a number of projecting fingers 9 on the inner side thereof, which projecting fingers fit into notches on the outer periphery of the ring 7. A center die 10 is secured to the bolster 1 by means of an annular ring 11 which is bolted to the bolster by means of three spaced bolts 12. The die 10 is provided with a central opening through which a punch carried by the upper bolster may descend to punch a small central hole in a sheet metal disc supported by the lower die.

The upper movable die, shown more particularly in Figs. 2 and 3, consists of a bolster 2 to which is bolted a plate 21, said plate having bolted thereto a number of tools 22, one above each of the fingers 9 shown in Fig. 1, said tools 22 being provided for the purpose of cutting notches into the sheet steel disc to be placed on the lower die. A trimming tool 23 in the form of a circular plate is provided for trimming the periphery of the sheet metal stamping to be placed in the lower die. The trimming tool 23 is bolted to the bolster 2 by means of a number of spaced bolts 24, said bolts also serving to bolt the plate 21 to the bolster. An annular stripping plate 25 is carried by the bolster 2 by means of a number of spaced bolts 26, said bolts 26 being freely slidable in the holes 27 in the bolster 2 thereby permitting a vertical movement of the stripping plate with respect to the bolster. A number of spaced springs 28 maintain the stripping plate 25 in its extended position away from the bolster 2. The upper bolster is provided with a center die or tool comprising a plate 30 bolted to the bolster 2 and carrying a stripping plate 31. The stripping plate 31 is carried by bolts 35 that are freely slidable through the plate 30 and through an aligned boring in the bolster 2, the stripping plate being maintained in its extended position by means of a number of springs 33. The stripping plate 31 is provided with a number of spaced openings in alignment with the openings in the plate 30 through which the bolts 32 pass. It is thus possible, by merely passing a screw driver or the like through the opening 34 to turn the bolts 32 and remove the center unit from the bolt 2, without dissassembling the rest of the die. A suitable tool is carried by the plate 31 for punching a circular hole through the center of the sheet metal disc carried by the lower bolster.

The operation of the die shown in Figures 1, 2 and 3 is as follows: With the upper and lower die sections separated, a sheet metal disc from which the stamping is to be made is placed upon the top of the lower die section. The disc rests upon the plate 3 and on the plate 7. Upon the descent of the upper die, the stripping plates 25 and 31 engage the sheet metal disc before the rest of the upper die engages it. This serves to firmly hold the sheet metal disc in place. Upon further descent of the upper die the cutting or notching tools 22 engage the stamping, as does also the center cutting tool carried by the plate 30. As the upper die continues to descend the plate 3 is forced downward, the annular plate 7 being, of course, stationary. The metal under the cutting tools 22 is thereby cut away leaving a number of notches in the sheet metal stamping. A central hole is also stamped through the sheet by the tool carried by the plate 30 since the member 10 upon the lower bolster 1 is stationary. When the upper die recedes from the lower die the stripping plates 25 and 31 remain in engagement with the stamping for a short period of time after the cutting tools have been drawn away from the stamping, said stripping plates being maintained against the stamping by their respective springs. This prevents the sheet metal stamping being drawn away from the lower die by the receding upper die. A moment later the upper die has been drawn away sufficiently to bring the stripping plates carried thereby away from the stamping. The stamping may now be removed from the lower die.

As previously stated, a wheel of a given standard outside diameter may have a hub of either of two different sizes depending upon whether the wheel is a front wheel or a rear wheel. In order to permit the same set of dies to be used in making stampings for rear wheels as well as for front wheels, an interchangeable center unit is provided for punching the hole at the center of the disc. As previously pointed out, the center unit shown in Figs. 1, 2 and 3 may be readily removed from the bolsters without disassembling the rest of the die structure. In Fig. 4 there is shown a different center unit which may replace the center unit shown in Figs. 1, 2 and 3 for forming a central hole of a different diameter from that formed by the unit shown in those figures. The interchangeable unit shown in Fig. 4 comprises a plate 30′ and a stripping plate 31′ similar to the corresponding plates shown in Fig. 2, of the same outside diameter as those plates and having a number of bolt holes and spring seats spaced identically to the spacing of the bolt holes and spring seats for the corresponding parts shown in Fig. 2. The members 30′ and 31′ differ from the members 30 and 31 only in that the inside diameter of the former members is different from the inside diameter of the latter members. The punch that is held by the plate 30′ is of a different diameter from the punch that is held by the plate 30, hence a different sized hub hole is formed in the metal stamping. A plate 11′ similar as to outside diameter and as to the spaced bolt holes to the plate 11, shown in Fig. 2, is bolted to the lower die 1 in the same manner as is the plate 11 of Fig. 2. The inside diameter of the plate 11' is different from the inside diameter of the plate 11 and there is carried by the plate 11' a center member 10' similar to the member 10 of Fig. 2 but having a different sized central opening therein for receiving the different sized punch carried by the member 30'. By replacing the center unit of the die shown in Fig. 2, a different sized hub hole may be punched in the metal stamping.

Figure 5:
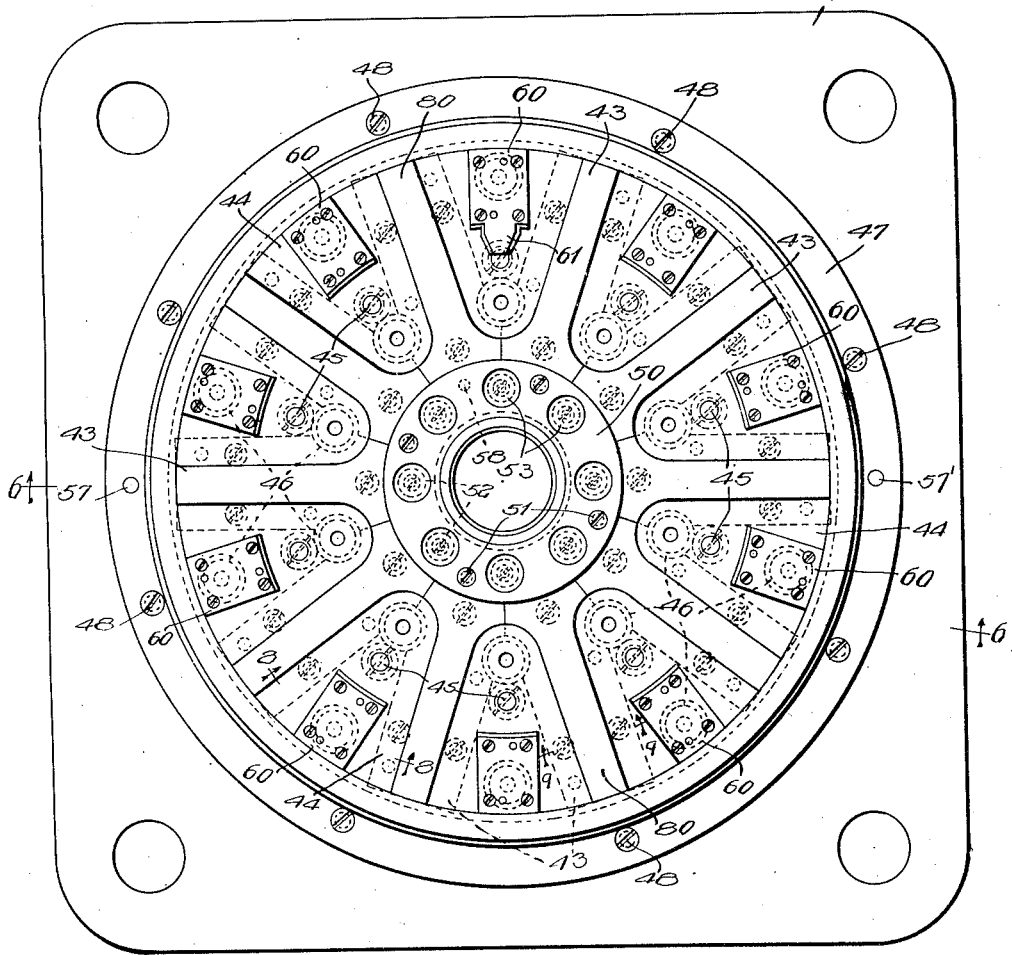
Fig. 5 is a top view of the lower forming die, said view being taken along the line 5—5 of Fig. 6 looking in the direction indicated by the arrows.
Figure 9:
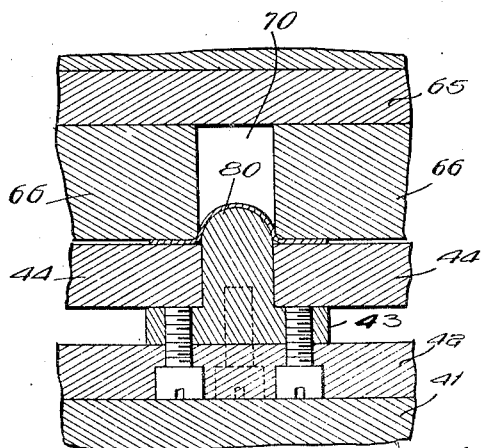
Fig. 9 is a fragmentary sectional view taken along the line 9—9 of Fig. 5.
Figure 7:
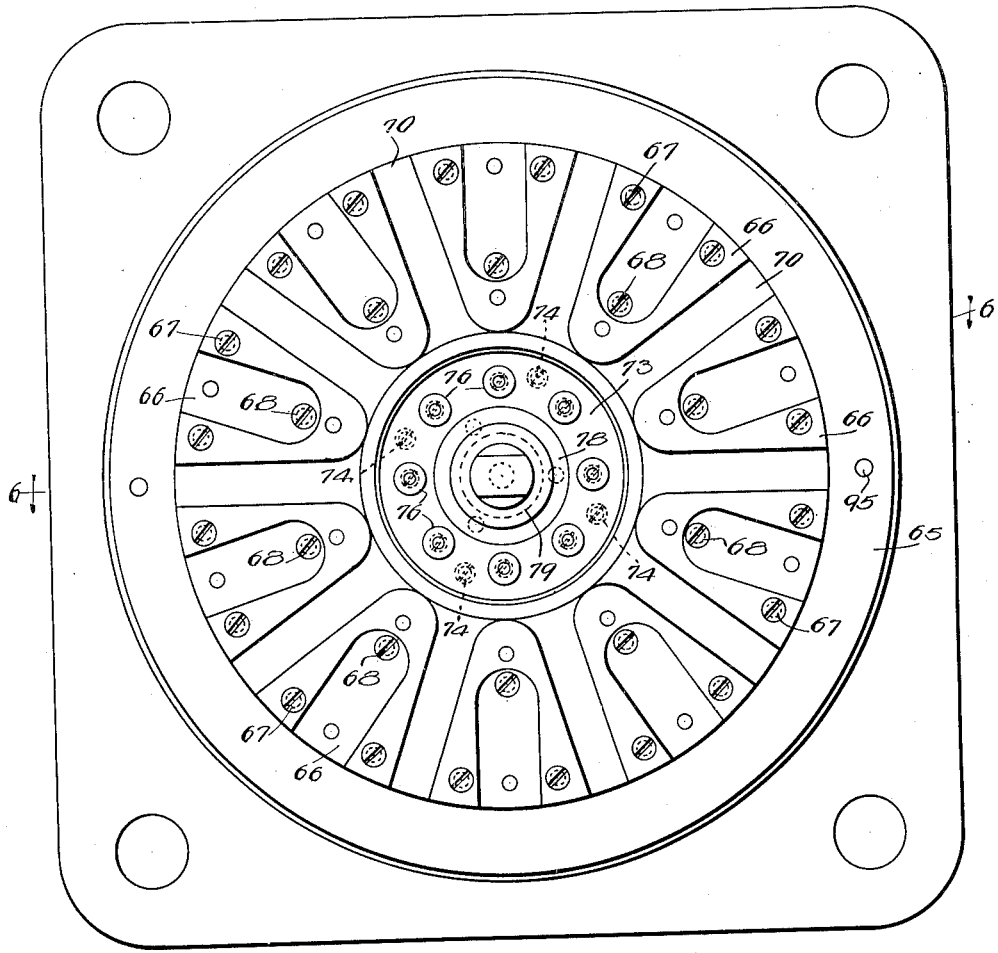
Fig. 7 is a bottom view of the upper forming die, said view being taken along a line such as 5—5 of Fig. 6 looking in a direction opposite that indicated by the arrows.

Reference may now be had to Figs. 5, 6 and 7 showing the die for forming semi-tubular spokes in the stamping formed by the die shown in Fig. 1. The die comprises a lower stationary bolster 41 and an upper movable bolster 42 as may be seen in Fig. 6. A plate 42 which is bolted to the lower bolster in a manner to be presently described has a number of tools 43 shaped as shown more particularly in Figs. 10 and 11 secured thereto by means of the bolts 44. The tools 43 are provided for the purpose of forming semi-cylindrical grooves in the stamping taken from the die shown in Fig. 1. There are ten such tools provided and the tools radiate outward from the center of the die as may be seen in Fig. 5. The tools 43 radiate outward like spokes of a wheel and between adjacent tools there are mounted stripping plates 44 of a shape more particularly shown in Figs. 12 and 13. The stripping plates 44 are secured to the lower bolster by means of bolts 45. The bolts 45 are freely slidable to a limited extent within the bolt holes in the bolster 41 thus permitting an up and down movement of the stripping plates 44 in the die. Springs 46 force the stripping plate upward away from the bolster. An annular plate 47, bolted to the bolster by means of a number of space bolts 48 which also secure the plate 42 to the bolster, limits the upward movement of the stripping plate 44.

A central tool member 50 bolted to the bolster 41 by means of four spaced bolts 51 is provided with eight uniformly spaced holes for receiving tools 52 for forming seats in the hub of the spider preparatory to punching holes therethrough. The tool 52 consists of a cylindrical rod fitting into the hole in the member 50, said rod having an enlarged head 53 for limiting the downward movement thereof and said rod being forced upward by a spring 53 carried in the bolster 41. An edge curling tool 56 is held in place by the member 50. The inner surface of the tool 56 is straight sided and is of greater diameter near the top than it is at the bottom. When the metal adjacent the central hole in the sheet metal stamping being worked upon is bent downward by a tool in a manner to be presently more fully described, any metal that extends beyond the enlarged inner diameter of the tool 56 is cut away by the punch that forces the metal downward, thereby providing a bent flange at the hub of the wheel, said flange being of a predetermined size. It may be seen from Fig. 5 that the spider formed by the die here shown will have ten spokes whereas there are only eight hub hole seats 53 provided for. In order to insure the formation of the seats 53 in a definite relation with the spokes 43, the die is arranged so that in assembling it each of the spokes 43 and each of the hub sheets 53 must be in a definite relation with respect to the front of the die.

To accomplish this result the bolster 41, the plate 42 and the annular member 47 are provided with two diametrically spaced dowel pin holes 57 and 57'. When the die is assembled, it is necessary for the plate 42 carrying the bolt forming members 43 to be secured to the bolster 41 in a definite angular position in order that the dowel pin holes shall align. Dowel pins are then passed through those holes. The member 50 is provided with one dowel pin hole 58 which in the assembly of the tools must be brought around to align with a similar dowel pin hole in the member 42. By thus assembling the die, it may be seen that the hub holes to be formed at 53 will bear a definite relationship to the various spokes to be formed in the spider. To each of the web members 44 is secured a plate 60. Of all the plates 60 only one, namely that at the front of the die has a forward projecting lip 61. The purpose of this will be apparent as the description proceeds.

The upper bolster 42 has a plate 65 bolted thereto in a manner to be presently explained, said plate 65 carrying the various forming tools that are supported by the upper die. The tools 66 placed one above each of the web members 44 of the lower die are bolted to the upper bolster by means of bolts 67—68, which bolts also secure the plate 65 to the upper bolster. The tools 66 are spaced from one another, the spaces 70 between the tools being immediately above the curved upper surface of the tool 43 carried by the lower bolster.

A circular tool 73, bolted to the plate 65 by the bolts 74, carries a series of plugs 76 for punching the seats in the hub of the metal sheet preparatory to the next operation of forming holes where the seats are punched. The member 78 carried within the member 73 prevents the upward bulging of the metal sheet adjacent the hub thereof at the time that the punch 79 bends the flanges into the hub portion of the spider.

At this time reference may be had to Figs. 10 and 11 showing the particular construction of the tool carried by the lower bolster for forming the semi-cylinder spokes in the sheet metal spider. The tool member 43 is of the shape shown, having an upstanding curved portion indicated at 80. The bottom of the tool has two flanges 81 and 82 above which the tool member 44 (Figs. 12 and 13) is supported by the springs as shown in Fig. 6. Bolts such as shown at 44' in Fig. 6 are passed through the plate 42 of Fig. 6 and thread into the holes 83, and 84 and 85 in the tool 43 thereby rigidly securing the tool in position upon the plate. The circular grooves 86 are cut into the flanges 81 and 82 to permit the spring 46 (Fig. 6) to pass through adjacent tools 43 without interfering, said springs bearing against the stripper plate 44 as may be seen from Fig. 6.

The stripper plate 44 of Fig. 6 is of the shape shown in Figs. 12 and 13, said stripper plates being provided on their lower sides with indentations 90—91 for receiving the end of the springs 46 of Fig. 6 and are provided with threaded holes 92 whereby the stripper plate may be secured to the bolts 46 of Fig. 4. A number of threaded holes 93 are provided on the top of the stripper plate whereby the member 60 (Fig. 6) may be secured to the stripper plate.

Figure 8:
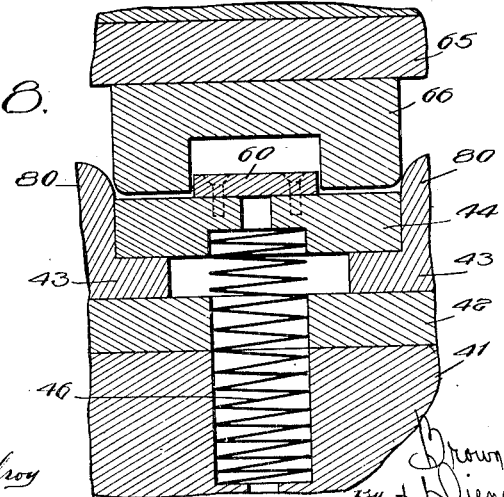
Fig. 8 is a fragmentary sectional view taken along the line 8—8 of Fig. 5.

When the upper die of Fig. 6 is removed from position above the lower die, the springs 46 force the stripper plates upward so that the top of the plates 44 is substantially in line with the top of the curved surface 80 of the tool 43. A notched disc such as is produced by the dies shown in Figures 1, 2 and 3 is placed upon the die shown in Figures 6, 7 and 8. As the upper die descends toward the lower die, the tool members 66 engage the sheet metal disc and upon further descent of the upper die those tool members force the metal that is immediately above the stripper plates 44 downward, the stripper plates descending with the metal. The curved portion 80 rides between adjacent tools 66 carried by the upper die, thus forcing the metal disc into the shape of a spoked disc with sheet metal between the spokes. The spokes in this case comprise semi-cylindrical elevated portions. The punch 79 enlarges the hole at the hub of the stamping and removes the excess metal that extends beyond the enlarged portion at the top of the member 56. At the same time, the tool sections 76 form seats in the hub of the spider. As may be seen in Figure 6, the seats are not punched through the metal to leave holes.

As previously stated one only of the plates 60 has a tongue 61 extending to the wear thereof. This tongue forms a U-shaped notch or elevation in the web of the metal between two of the spokes at the front of the die. Since this metal is to be subsequently cut away this notch is of no particular importance insofar as concerns the finished product as formed by the die. This notch indicates which portion of the stamping was in the front portion of the die, an indication which is of importance when the stamping is put into the next set of dies for performing the next operation upon the stamping. It is important that the spokes be in their same relative positions in the subsequent dies because, if the spokes are placed in different positions in the next die, then the tool for forming the holes in the hub of the spider, as indicated at 53, will not line up with the seats formed in the hub by this die.

In order to properly locate both the bolt forming tools and the tools for forming the depressions around the hub, in the upper die with respect to the corresponding parts in the lower die, the plate 65 is provided with a dowel pin hole 95 which is made to line up with a corresponding hole in the upper bolster 42.

When the upper die shown in Fig. 6 recedes from the lower die upon the completion of the stamping operation, the stripper plates 44 are forced upward by the springs 46 thereby forcing the sheet metal stamping upward and preventing the stamping from sticking to the lower die.

The center unit comprising the members 50 and 56 is held in the lower die and the members 78 and 79 held in the upper die are readily removable so that a different center unit may be inserted into the die for forming a spider having a different sized hub.

The next step in the formation of the spider consists in trimming away the excess metal between adjacent spokes so as to leave a narrow flange along the side of the spokes and at the connecting nave between adjacent spokes and also to punch a number of holes through the hub of the spider at the points where the depressions were made at 76 and 53 by the preceding dies. For this purpose there is provided the die shown in Figs. 15, 16 and 17.

Figure 15:
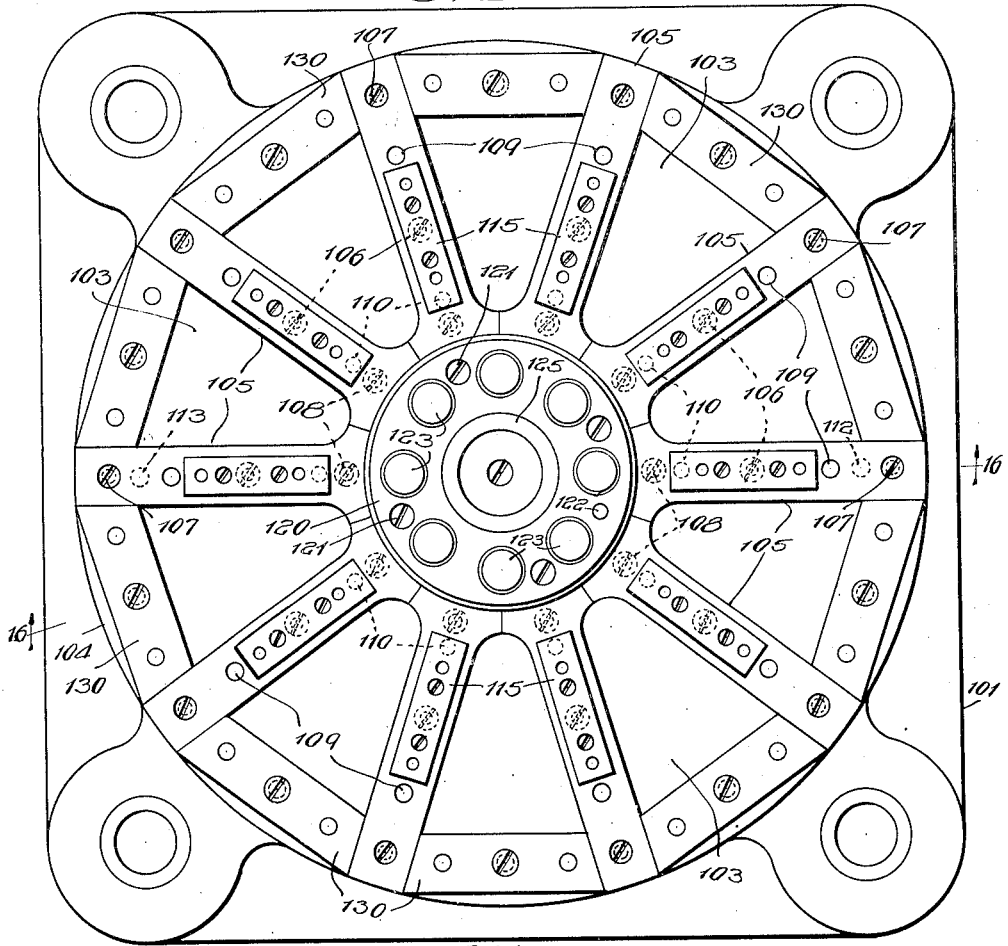
Fig. 15 is a top view of the bottom trimming and piercing die, said view being taken along the line 15—15 of Fig. 16 looking in the direction of the arrows.
Figure 16:
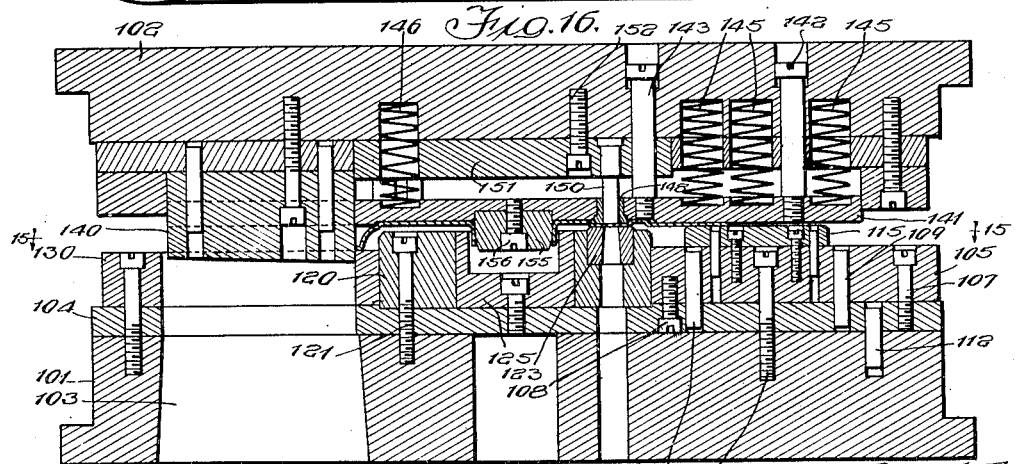
Fig. 16 is a section of the trimming and piercing die, said view being taken along the line 16—16 of Fig. 15.
Figure 17:
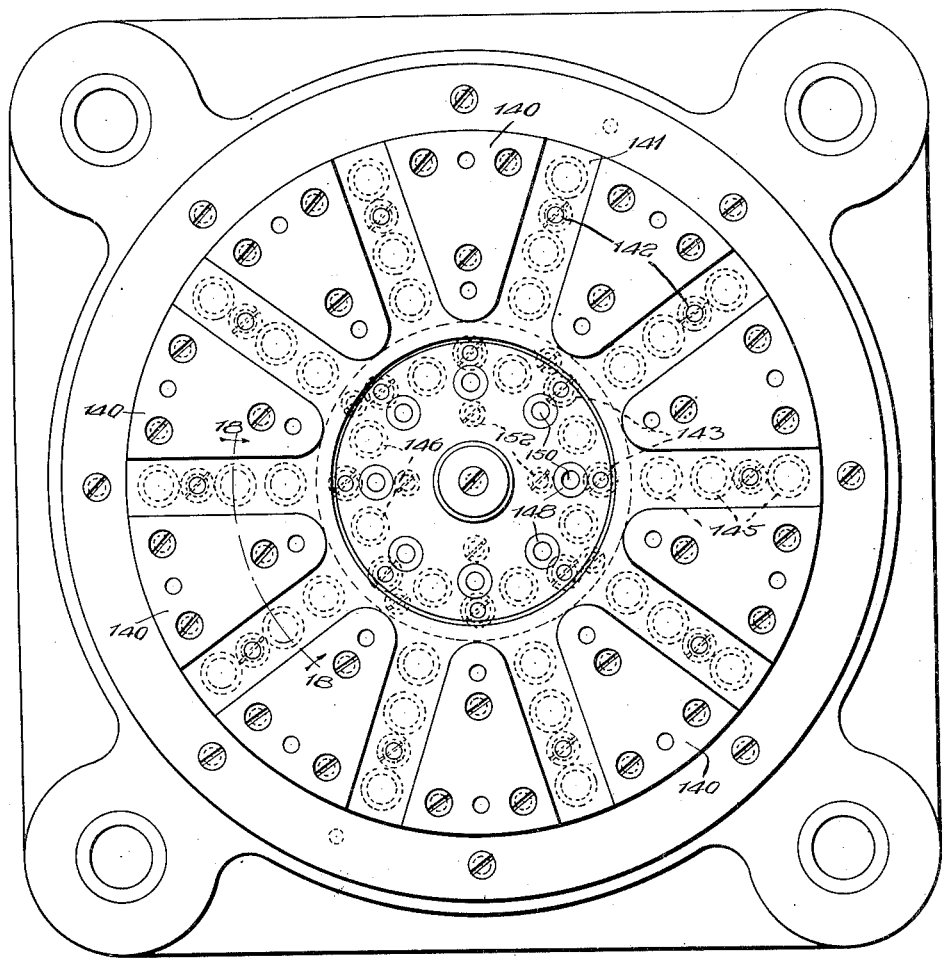
Fig. 17 is a bottom view of the top trimming and piercing die, said view being taken substantially along the line 15—15 of Fig. 16 looking in a direction opposite that indicated by the arrows.

The die shown in Figs. 15, 16 and 17 consists of a lower bolster 101 and an upper bolster 102 upon which the various forming tools are mounted. The lower bolster is spider shaped having ten radial spokes extending outward from the hub of the bolster toward the periphery thereof. The spaces 103 between adjacent spokes provide a passage through which the metal that is cut from the sheet metal stamping passes. A plate 104 having a number of openings corresponding to the openings 103 and a number of spokes is bolted to the bolster in a manner to be presently described.

Figure 18:
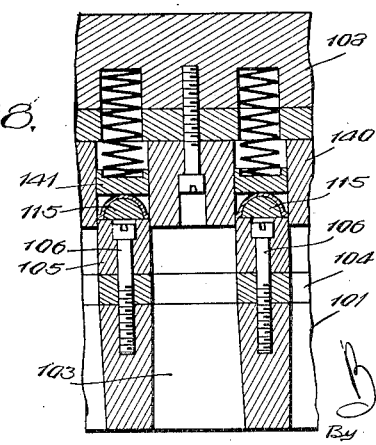
Fig. 18 is a fragmentary sectional view taken along the line 18—18 of Fig. 17.

Tool holding plates 105 are secured to each of the spokes in the plate 104, the bolts 106 serving to secure the members 104 and 105 to the bolster 101 and the bolts 107 and 108 further serving to secure the member 105 to the member 104. Dowel pins 109 and 110 further secure the two members 104 and 105 together. Two dowel pins 112 and 113 upon opposite sides of the die serve to definitely locate the plate 104 with respect to the bolster 101, so that in the assembly of the die certain of the spokes will be at the front of the die and other of the spokes will be at the sides of the die. This is of importance due to the fact that there are ten spokes in the wheel and only eight holes at the hub of the wheel. Plates 115 are secured to the respective plates 105, each of the plates 115 having a flat bottom for securing it to the plate 105 and being of semicircular cross section, as may be seen in Fig. 18. Two dowel pins and two bolts secure each of the plates 115 to the plates 105. An annular ring 120 is secured to the bolster 101 by means of four bolts 121, the ring being in a certain angular position in the bolster 101 as determined by the dowel pin 122 which passes through a hole in the member 102 and through a hole in the member 104. The member 120 has eight uniformly spaced holes therein into each of which is press fitted a cutting tool 123. Each of the cutting tools 123 has a central hole therein through which a punch carried by the upper die passes, thereby punching a hole in the seat at the hub of a sheet metal stamping placed in the lower die.

A readily removable centerpiece 125 is mounted at the center of the piece 120, said centerpiece being held to the plate 104 by a suitable bolt. Plates 130 are secured to the lower bolster between the ends of adjacent plates 105, thus closing the sides of the openings 103 at the tops thereof.

The upper bolster 102 has a number of spaced cutting tools 140 suitably bolted thereto between adjacent spokes in a spider shaped disc 141 which is also carried by the upper bolster. The member 141 constitutes a stripping plate and is held in place by a number of bolts 142 and 143. The bolts 142 each pass through one of the spokes in the member 141, whereas the bolts 143 are located at the center hub portion of the member 141. As may be seen from Fig. 17, there are ten spokes 141 whereas there are only eight spaced bolt holes 143. In order that the bolt holes 142 as well as the bolt holes 143 shall line up with the corresponding holes in the bolster, it is necessary to place the member 141 in the bolster in a certain predetermined position so that the respective spokes are properly located. By way of example, it may be mentioned that if the member 141 were rotated through one-tenth of a revolution from the position shown in Fig. 17, then although the bolt holes 142 would still align with the corresponding holes in the bolster 102, the bolt holes 143 would not align.

Thus it may be seen that the spider member 141 has a predetermined position in the bolster. The bolts 142 and 143 are freely slidable through the bolster, and the plate member 141 is maintained in its furthermost position from the bolster 102 by means of a number of springs 145 along the spokes of the spider member and 146 around the hub of the spider member. Eight forming tools 148 are pressed into corresponding holes around the hub of the member 141, said forming tools having central holes therein through which punches 150 pass. The punches 150 are adapted to punch holes through the seats formed in the stamping that is placed on the lower die. The punches 150 are held in the die by the circular plate 151 which is bolted to the upper bolster by means of four screws 152. A readily removable centering tool 155 is secured to the member 141 by means of a screw 156. The member 155 and 125 (Fig. 16) are loose fitting into one another and do not act to shape the central hole in the stamping. Those members merely maintain the stamping suitably centered. To use the die shown in Fig. 16 with stamping having different central openings in the hub portion, the members 155 and 125 are removed from the die and are replaced by other members of the desired size. It may be seen that the center unit including the members 125 and 155 are readily removable from the die without the necessity of disassembling the rest of the die structure.

A sheet metal spider, such as shown in Figs. 2, 3 and 4 in my pending application above referred to, which is the spider that has been formed by the two sets of dies previously described in this application is placed into the lower die. As the dies approach one another the spider stripping member 141 engages the sheet metal stamping held in the lower die before the rest of the upper die engages it, thereby firmly holding the stamping in place. Upon further descent of the upper die the cutting members 140 engage the work and trim the metal away from the semitubular spokes leaving a short flange along the spokes and along the nave of the spider between adjacent spokes. The punches 150 stamp a hole through the seats previously formed in the sheet metal stamping, and likewise suitably form the seat around said hole. As the die recedes from the work the cutting tools leave the work before the spring pressed stripping plate does, and as the upper die continues to recede from the work, the stripping plate 141 prevents the work from adhering to the receding die. The sheet metal stamping is now of the shape shown in Fig. 5 in my pending application, above referred to.

It is to be noted that the lower edge of the cutting tools 140 are tapered so that the portion of the cutting tool 140 that is adjacent the nave between two adjacent spokes strikes the sheet metal being worked upon first during the descent of the upper die, and as the upper die continues to descend, the cutting action takes place from the hub of the wheel outward toward the outer end of the spokes. It is advantageous to cut the web of the spider between adjacent spokes from the nave outward and also along adjacent spokes at the same time since this prevents the forcing of the metal toward the center, any deformation of the metal that does take place being outward toward the periphery of the spider.

Figure 19:
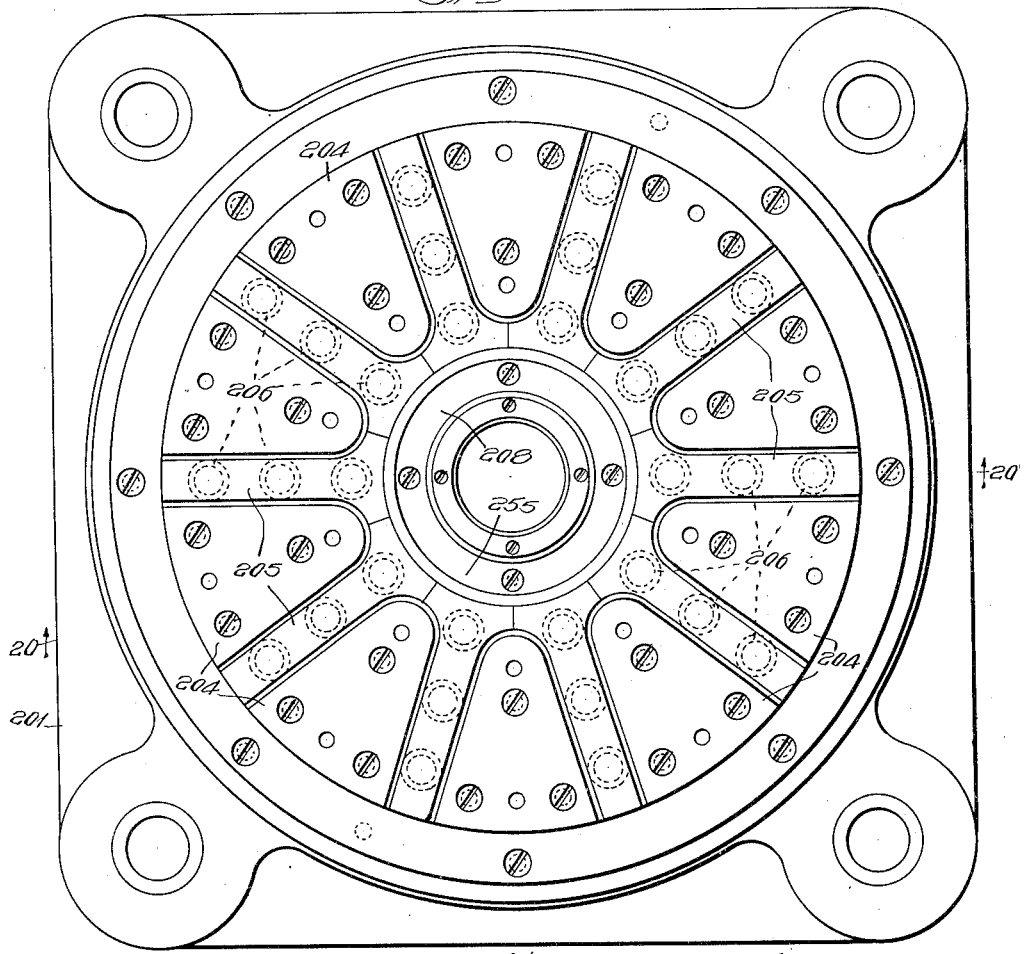
Fig. 19 is a top view of the lower edge curling die, said view being taken along the line 19—19 of Fig. 20 looking in the direction of the arrows.
Figure 20:
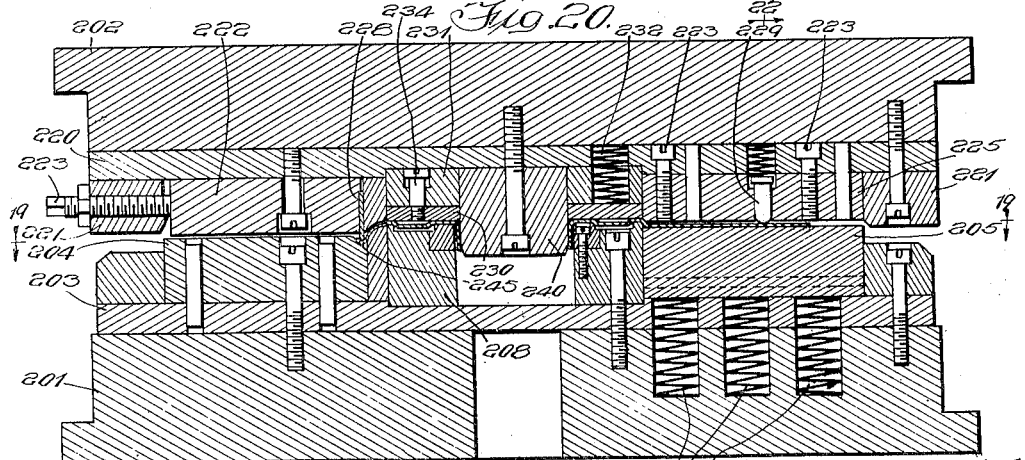
Fig. 20 is a sectional view of the same die, said view being taken along the line 20—20 of Fig. 19.

Reference may now be had to the die shown in Figs. 19 to 21, which is the die for performing the next operation upon the sheet metal stamping, namely, the die for curling the straight flanges that were left by the preceding die along the edges of the semitubular spokes and at the nave between adjacent spokes. The die comprises a lower bolster 201 and an upper bolster 202 upon which the various forming tools are mounted. The plate 203, secured to the lower bolster, has a number of anvils 204 secured thereto. The spoke, or spider supports, 205 are mounted between adjacent anvils and have a limited sliding movement in an up and down direction between the anvils. The springs 206 force the members 205 upwards, a web at the bottom of the members 205 limiting the upward movement, as may be seen from Fig. 22. A suitable readily removable centerpiece 208 is bolted to the lower bolster.

A plate 220 carrying various operating tools is secured to the upper bolster 202, the same bolts that secure the plate to the bolster also serving to secure the metal ring 221 to the bolster. Triangular wedge members 222 are bolted to the upper bolster, the bolt holes in the wedge members being slightly elongated so as to permit a slight forward and backward movement of the wedge members. A screw 223' is provided for moving the wedge members 222 forward and backward. The wedge members 222 are mounted each above one of the anvils 204. Concave holding tools or spokes 225 are bolted to the upper bolster between adjacent wedges 222 by the two bolts 223. Steel clock springs 228 are held in place between the members 225 and the wedges 222. It is to be noted that a rabbet is formed along the periphery of the triangular wedge member 222 for holding the spring members 228 against upward movement. The bottom of the spring is of a circular shape and when pressed into the work forms a curled flange therein. By retracting the wedges 222 a slight distance, the spring 228 may be removed for replacement purposes. Because of the adjustability of the member 222 springs of different thicknesses may be used. A spring pressed stripping plunger 229 is carried within the member 225 for preventing the adhesion of the sheet metal being worked upon when the upper bolster recedes from the lower bolster. A central spring pressed stripping plate 230 is secured at 234 to the annular member 231, which is itself bolted to the member 220 by the bolts 235. The stripping plate 230 is slidable with respect to the annular member 231, and is held in its extended position by springs 232. A readily removable centering tool 240 is carried by the upper bolster, the outside diameter of the tool 240 being considerably less than the inside diameter of the member 208 so that the member 240 serves merely to maintain the stamping centered, but does not form the hub of the stamping in any way whatsoever. The members 208 and 240 may be readily removed and replaced by members having different dimensions where a stamping of a different central hub opening is used. This may be accomplished without in any way disassembling the rest of the die. The operation of the die shown in Figs. 19, 20 and 21 is as follows: When the upper die section descends toward the lower section the stripping plunger 229 and the stripping plate 230 engage the stamping before the rest of the die section engages thereby holding the stamping securely in place. Upon further descent of the die, the lower curved edge of the spring insert 228 engages the flange along the sides of the spokes of the spider and along the nave between adjacent spokes, and, by forcing it against a suitable depression in the anvil 204 turns the straight flanges into curled flanges, as indicated at 245. When the upper die section recedes from the lower section the stripping plunger 229 and the stripping plate 230 remain in engagement with the stamping after the steel spring insert 228 has left the stamping thereby stripping the stamping from the upper die. During the working operation the spring pressed members 205 descended slightly, and when the upper die recedes from the lower die the members 205 are forced upward by the springs 206, thereby stripping the stamping from the lower die. This finishes the working operation upon the spider, the spider being now of a shape such as shown in Fig. 7 in my pending application, above referred to.

It is to be noted that the die shown in Figs. 5, 6 and 7 and that shown in Figs. 15, 16 and 17 are assembled with predetermined ones of the spokes on the side of the die and different predetermined spokes at the front or rear of the die. The assembly of both of those die sets is the same, so that when the stamping taken out of the first of those two sets of dies is placed in the other set so that the part of the stamping that was at the front in the first mentioned die, as indicated by the notch formed by the lip 61 (Fig. 5), is at the front in the second die, then the radial depressions in the stamping as well as the hub holes in the stamping will line up with the corresponding parts of the die. No such placement of the stamping is necessary in the die shown in Figs. 19, 20 and 21 since that die does not operate upon the hub holes. The top of the centerpiece 208 held in the lower bolster of the last mentioned die set is merely provided with a circular groove 255 into which the seats in the stamping may extend.

While I have herein shown and described a preferred embodiment of my invention, it is to be understood that the invention is not limited to the precise construction shown, the same being merely illustrative of the invention. What I consider new and desire to secure by Letters Patent is:

1. The method of making a metal spider having a number of symmetrically spaced spokes and a different number of symmetrically spaced indentations at the hub of the spider which comprises, passing a metal sheet through successive dies to form the spider, and during one of the operations forming an indicating mark at a point on the spider removed from the center thereof for locating the angular position of the spider in the subsequent die to bring both the spokes and the hub indentations in working relationship to the subsequent die, and removing the identifying mark in a succeeding die operation.

2. The method of making a spider of the class described, which comprises blanking a circular disc out of sheet metal, drawing semicylindrical spoke portions joined at the hub, and trimming the metal to leave narrow flanges along the sides of the spoke portions and the web portions joining adjacent the spokes, said trimming being worked from the web portion between adjacent spokes outward toward the end of the spokes.

3. The method of making a spider of the class described, which comprises blanking a circular disc of material, drawing semicylindrical spoke portions joined at the hub, and trimming the material to leave narrow flanges along the sides of the spoke portions and the web portion adjoining the spokes, said trimming being done by shearing the material at the web portion between adjacent spokes and continuing the shearing action along both spokes simultaneously from the web toward the outer end of the spokes.

4. A die comprising a hollow V-shaped body portion, a V-shaped plate inserted into the V of the body portion, a spring steel die insert retained against the inner walls of the hollow body portion by said plate, and means for advancing and retracting the plate toward and away from the apex of the V for tightening or loosening the grip on the insert.

5. In a die for performing work upon the hub and upon the portions between the hub and the outer periphery of a sheet metal member in the manufacture of spokes spiders for wheels, a bolster supporting the various forming tools, the tools including a plurality of similar tools for performing working operations upon the hub portion of the sheet metal member, a different number of uniformly spaced radially extending similar tools for performing working operations in the formation of spokes in the sheet metal member, and means for making an identifying mark at one portion of the sheet metal member to indicate the position of that part of the member in the die.

6. In a die for performing work upon the hub and upon the portions between the hub and the outer periphery of a sheet metal member in the manufacture of spoked spiders for wheels, a bolster supporting the various forming tools, the tools including a plurality of similar tools for performing working operations upon the hub portion of the sheet metal member, a different number of uniformly spaced radially extending similar tools for performing working operations in the formation of spokes in the sheet metal member, means for assuring the assemblying of the first mentioned tools and of the last mentioned tools in predetermined angular positions with respect to one another and with respect to the front of the bolster, whereby the hub workings and the spoke workings are in definite relationship with respect to one another and with respect to the front of the sheet metal member as removed from the die, and means for making an identifying mark at one portion of the sheet metal member to indicate the position of that part of the member in the die.

7. A die having a pair of relatively movable members including cutting means for cutting away a stamping extending to the periphery of the work being operated on, said cutting means engaging the work first at a point remote from the periphery of the work and, upon continued movement of said members towards one another, said cutting being extended out towards the periphery of the work.

8. In a die for performing work upon the hub and upon the portion between the hub and the outer periphery of a sheet metal member in the manufacture of spokes in a spider for wheels, a bolster supporting the various forming tools, the tools including a plurality of similar tools spaced circumferentially about the hub portion of the spider for performing working operations upon the hub portion thereof, a different number of uniformly-spaced radially-extending similar tools for performing working operations in the formation of spokes in the sheet metal member, and pin means permitting said spoke workings to be assembled only in a predetermined angular position with respect to said hub workings.

GEORGE SPATTA.